No. 777,851. PATENTED DEC. 20, 1904.
W. H. GREGORY.
ELECTRIC BATTERY.
APPLICATION FILED MAY 14, 1904.
NO MODEL.
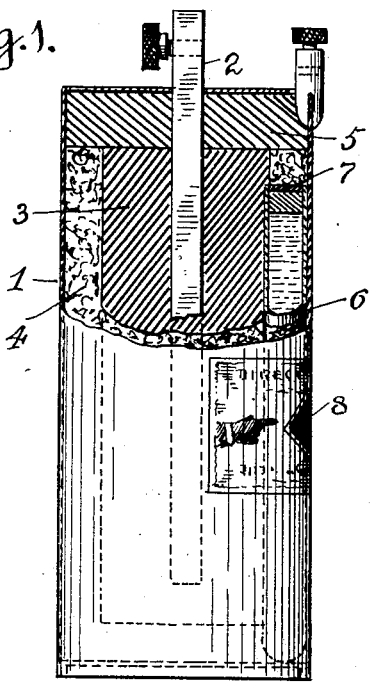
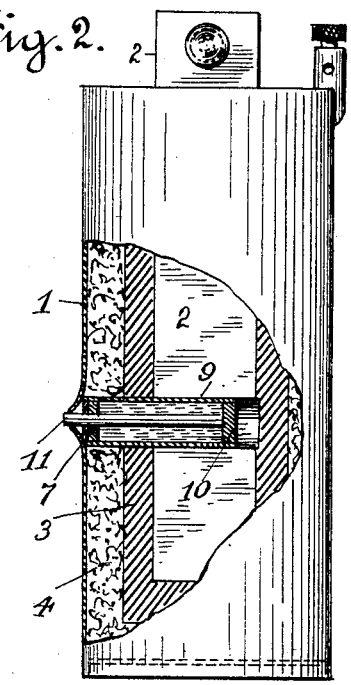
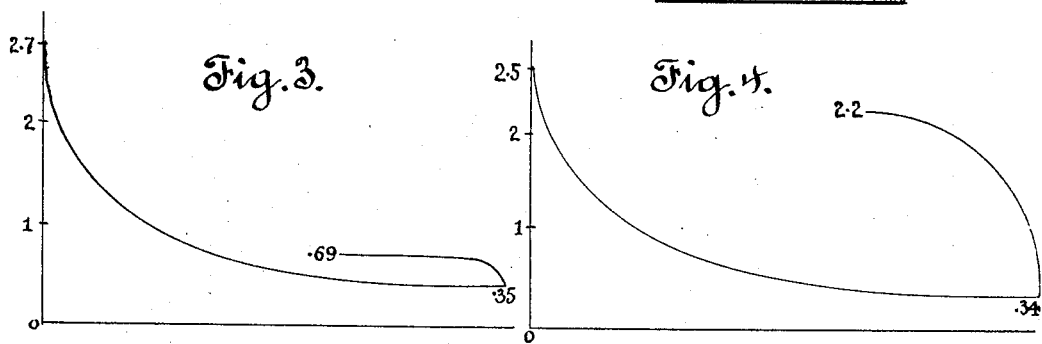
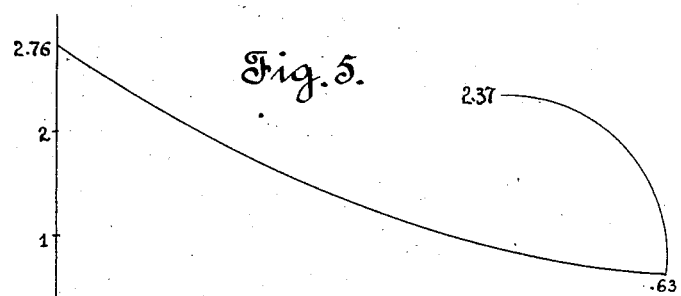

No. 777,851.	Patented December 20, 1904.

UNITED STATES PATENT OFFICE.

WILLIAM H. GREGORY, OF VALLEJO, CALIFORNIA.

ELECTRIC BATTERY.

SPECIFICATION forming part of Letters Patent No. 777,851, dated December 20, 1904.

Application filed May 14, 1904. Serial No. 207,955.

*To all whom it may concern:*

Be it known that I, WILLIAM H. GREGORY, a citizen of the United States, residing at Vallejo, Solano county, State of California, have invented certain new and useful Improvements in Electric Batteries; and I do hereby declare the following to be a full, clear, and exact description of the same.

The present invention relates to that class of electric batteries commonly known as "dry-cell batteries," used for open-circuit work—as, for instance, house-telephones, call-bell circuits, signal-bells, door-bells, &c.—the object of the invention being to provide such dry batteries with means whereby the battery may be resupplied with moisture for the purpose of reviving the battery or renewing its energy after the normal life of the battery has ceased or the battery has become worn out by the work to which it has been subjected.

The ordinary or normal life of a dry or dry-cell battery is one year, after which period of time the voltage has diminished to such an extent that the cell loses its value as a battery and must be taken out and thrown away, being replaced by a fresh or unused battery, inasmuch as the dry-cell battery does not lose its vitality or energy by reason of what may be termed "overwork" or the dissipation of its chemicals, but by reason of the evaporation of the moisture in the sal-ammoniac paste and manganese oxid constituting the body of an ordinary dry-cell battery. By reason of this evaporation of the original moisture only from ten to twenty per cent. of the chemicals have been consumed during the working of the battery. Hence with each worn-out battery thrown away from ninety to eighty per cent. of the original battery is destroyed. This evaporation of the original moisture contained in the body of the battery is quick in dry climates. Hence the life of the battery is considerably shorter in a dry climate than in a cool moist climate.

Notwithstanding the fact that the cell of a dry battery is sealed to water-tightness the ingredients lose their moisture, without which the cell is useless for active service. Inasmuch as the depolarizer of the batteries—viz., manganese oxid—is approximately three times in excess of the quantity of zinc used, it is apparent, as only about fifteen per cent. of the original zinc is chemically consumed during the normal life of the battery, that with each battery thrown away about eighty per cent. of the unused material goes to waste.

Dry-cell batteries are often revived or reclaimed by puncturing the seal and adding a small quantity of water to the body of the cell; but this method subjects the cell to a more rapid evaporation unless the seal is again replaced to moisture and air tightness. If provision be made whereby the evaporated moisture originally contained in the body of the battery-cells may be replenished without destroying the seal, the properties of the unused chemicals are such as to restore the battery to a working condition of activity of approximately the original potentiality and efficiency, thereby considerably increasing the usefulness of the battery and prolonging the life thereof.

To comprehend the invention, reference should be had to the accompanying sheets of drawings, wherein—

Figure 1 is a vertical elevation part-sectional view of an ordinary dry-cell battery with the liquid-holder for replenishing moisture to the body of the cell secured therein. Fig. 2 is a similar view disclosing a modification of the liquid-holder secured therein. Figs. 3, 4, and 5 are diagrammatic views disclosing readings as to reduction of voltage and recuperation curves of dry-cell batteries.

The numeral 1 designates the ordinary outer metallic casing for a dry-cell battery, and 2 the carbon of the battery, which carbon is embodied in the inner filling or body 3 of manganese oxid. This body of manganese oxid is inclosed or enveloped by the wall 4 of sal-ammoniac paste, the battery-cell being rendered moisture and air tight by the hermetical seal 5. Such is the usually-constructed dry-cell battery, the requisite moisture for the battery being contained in the wall 4 of sal-ammoniac and body 3 of manganese oxid.

It will be understood that no attempt has been made to describe any particular form of battery, inasmuch as the invention is applicable to any style of dry-cell battery.

Within the battery-cell is embedded, so as to lie against the inner surface of the zinc or metallic casing, preferably a glass tube 6, which tube is filled with water or any desired liquid. This tube after being filled is closed at its open end in any suitable manner, as by seal 7, Fig. 1 of the drawings. The intention is that this tube shall be broken after the normal life of the battery has become destroyed by the absorption of the original moisture contained in the body of the cell in order that the liquid contained therein may be liberated to saturate or resupply the necessary moisture to the body of the cell, which is composed of the sal-ammoniac paste and manganese oxid. The tube may be destroyed by striking the outer casing 1 of the battery a blow the force of which will break the tube. To designate the location of the tube, a mark 8 is placed on the outer face of the casing 1.

Of course I do not wish to be understood as confining the invention to a breakable tube to liberate the liquid replenishing the absorbed moisture, for this may be provided for in numerous ways. Fig. 2 of the drawings discloses a modification of the means for supplying the required liquid to replenish the moisture. In this case a tube 9 is fitted with a tight joint through the wall of the casing 1, the same extending well into the material comprising the body of the cell. This tube at its inner end is provided with a valve 10, which is moved by the valve-rod 11. Said valve-rod projects slightly beyond the tube 9, so as to be operated from the outside of the battery by hand-pressure or otherwise. Under this construction to liberate the liquid it is only required to force the valve stem or rod 11 inward, which unseats the valve to uncover the inner open end of the tube 9 and permit the liquid to escape therefrom. Preference is given to the breakable tube 6, owing to its simplicity, inexpensiveness, and ease of manipulation. The glass tube 6, which is inserted within the cell during the construction of the battery, does not materially increase the cost attached to the manufacture of the battery and contains no parts to cause leakage, whereas the form of liquid-holder disclosed in the modification Fig. 2 of the drawings is somewhat difficult to construct in connection with the battery and tends toward leakage in handling.

For clearness as to the value of the invention it has been deemed advisable to disclose in the drawings various readings taken as to the reduction of voltage and recuperation curves of dry-cell batteries, Fig. 3 illustrating the curve of recuperation of an ordinary dry-cell battery without the means for resupplying the evaporated or consumed moisture, while the readings of Figs. 4 and 5 disclose the recuperation curve after such moisture was replenished. These readings are the result of a number of experiments made to illustrate the decline of voltage of dry batteries and the curve of recuperation under varying conditions, which readings are averages of a number of tests made on batteries of different manufacture, but all of practically the same initial voltage. The reading disclosed by Fig. 3 of the drawings was taken from two cells placed in series, which were connected to an ordinary door-bell circuit. The circuit was alternately opened and closed for periods of five minutes each by clockwork for four hundred hours actual time, making two hundred hours working time. In this case the initial voltage was 2.7 volts, which was reduced to .35 volt in four hundred hours or a voltage decrease for each cell of 1.175 volts, which rendered the batteries useless. The circuit was then opened and the battery allowed to stand on open circuit. Readings were taken every twenty-four hours, and at the end of the third day the voltage became almost constant at .69 volt, a voltage of .345 for each cell. The cells were only able to recuperate .17 volt each. Reading disclosed by Fig. 4 illustrates a similar test to that just described; but the cells were supplied with test-tubes or glass tubes 6, placed inside the outer case, Fig. 1 of the drawings. The tubes were filled with a solution of sal-ammoniac, corked and sealed with paraffin. The initial voltage of two cells in series was 2.5 volts, which was reduced in four hundred hours to .34 volt. The test-tubes were then broken by the blow of a hammer upon the outer case next the test-tubes, so as to liberate the liquid contained therein. The cells were allowed to recuperate on open circuit and readings taken every twenty-four hours for three days. At the end of the third day the voltage was 2.2 volts, showing a marked rise in voltage above the batteries in test-readings set forth in Fig. 3 of the drawings. Fig. 5 of the drawings illustrates the reading resulting from a number of tests on two dry cells placed in series on an intercommunicating telephone system. The cells were fitted with the test or glass tubes 6, as in test resulting in reading set forth in Fig. 3 of the drawings. Readings were taken of the voltage every month for one year. The original voltage of the two cells was 2.76 volts, which was reduced to .63 volt at the end of twelve months. The liquid-holding tubes 6 were then broken, and at the end of the third day the voltage was 2.37 volts, which was a rise of 1.71 volts or a rise of .855 volt per battery-cell in three days from time tubes were broken and moisture released. Four months after breaking the tubes the voltage read 2.18. In all these experiments the batteries were placed in cool dry places free from any great change of temperature.

Having thus described my invention, what is claimed as new, and desired to be protected by Letters Patent, is—

1. The combination with the cell of a dry battery, of a breakable liquid-holding tube containing an auxiliary supply of liquid arranged therein for resupplying moisture thereto.

2. The combination with the casing of a dry-cell battery, of a holder containing an auxiliary supply of liquid arranged therein for resupplying moisture to the cell of the battery.

3. The combination with the casing of a dry-cell battery, of a sealed holder containing an auxiliary supply of liquid arranged therein for resupplying moisture to the cell of the battery, and means for liberating the auxiliary supply of moisture.

4. The combination with the casing of a dry-cell battery, of a breakable sealed holder containing an auxiliary supply of liquid arranged therein for resupplying moisture to the cell of the battery.

In witness whereof I have hereunto set my hand.

WILLIAM H. GREGORY.

Witnesses:
W. T. O'DONNELL,
BENNETT BENSON.